(12) United States Patent
Borden et al.

(10) Patent No.: US 9,033,534 B2
(45) Date of Patent: May 19, 2015

(54) HANDS-FREE VISION AID

(75) Inventors: Peter G. Borden, San Mateo, CA (US); Peter H. Muller, Woodside, CA (US)

(73) Assignee: Jasper Ridge Inc., San Mateo, CA (US)

( * ) Notice: Subject to any disclaimer, the term of this patent is extended or adjusted under 35 U.S.C. 154(b) by 450 days.

(21) Appl. No.: 13/410,189

(22) Filed: Mar. 1, 2012

(65) Prior Publication Data

US 2013/0063929 A1 Mar. 14, 2013

Related U.S. Application Data

(60) Provisional application No. 61/546,011, filed on Oct. 11, 2011, provisional application No. 61/526,164, filed on Aug. 22, 2011, provisional application No. 61/477,599, filed on Apr. 20, 2011.

(51) Int. Cl.
*F21V 21/08* (2006.01)
*G02C 11/04* (2006.01)

(52) U.S. Cl.
CPC ...................... *G02C 11/04* (2013.01)

(58) Field of Classification Search
CPC ............. A43B 1/0036; F21Y 2101/02; A41D 27/085; F21V 21/084; F21V 33/0004; F21V 5/048; F21W 2121/06; A41B 9/04
USPC ............... 362/230, 235, 249.01, 249.02, 103, 362/105, 185
See application file for complete search history.

(56) References Cited

U.S. PATENT DOCUMENTS

| | | |
|---|---|---|
| 3,634,676 A | 1/1972 | Castellano |
| 4,234,910 A | 11/1980 | Price |
| 5,224,772 A | 7/1993 | Fustos |
| 5,920,369 A | 7/1999 | Kroman |
| 6,290,368 B1 | 9/2001 | Lehrer |
| 6,575,588 B2 | 6/2003 | Strehl |
| 6,966,668 B2 * | 11/2005 | Cugini et al. ................. 362/103 |
| 7,255,435 B2 | 8/2007 | Pratt |
| 7,562,979 B2 | 7/2009 | Waters |
| 7,607,775 B2 | 10/2009 | Hermanson et al. |
| 7,942,522 B2 | 5/2011 | Sonsino |

(Continued)

OTHER PUBLICATIONS

Beam N Read® Hands Free Lights, 2003-2010 ASF Lightware Solutions, located at <http://www.readinglight.com/cgi-exec/store/commerce.cgi?product=led_lights&cart_id=8087728.4>, last visited on Sep. 13, 2011, 9 pages.

(Continued)

*Primary Examiner* — Jong-Suk (James) Lee
*Assistant Examiner* — Tsion Tumebo
(74) *Attorney, Agent, or Firm* — Morrison & Foerster LLP

(57) ABSTRACT

Described herein are hands-free vision aids that may be used for low-vision reading. These vision aids may be beneficial for individuals with low-vision disorders such as age-related macular degeneration, retinitis pigmentosa, and other visual disorders. The vision aids described here comprise an optical system with one or more light sources configured to provide a rectangular field of illumination with high illuminance levels bounded by high contrast perimeter. Such an illumination field greatly illuminates a targeted viewing region while reducing glare that arises from illuminating peripheral regions. Some vision aids use green light with high illuminance values for improving visual acuity and comfort for long-duration reading. The optical system of a vision aid may be configured to fit onto and/or integrate with eyeglass frames.

9 Claims, 11 Drawing Sheets

(56) References Cited

U.S. PATENT DOCUMENTS

| 7,946,705 | B1 | 5/2011 | Hsu | |
|---|---|---|---|---|
| 2008/0068824 | A1 | 3/2008 | Wang | |
| 2008/0123048 | A1 | 5/2008 | Volk | |
| 2009/0116214 | A1* | 5/2009 | Phillips et al. | 362/84 |
| 2010/0182563 | A1 | 7/2010 | Waters | |
| 2011/0157874 | A1* | 6/2011 | Sant et al. | 362/106 |
| 2012/0092863 | A1* | 4/2012 | Krijn et al. | 362/231 |

OTHER PUBLICATIONS

Costello, M.J. et al. (Jan. 2007). "Predicted Light Scattering from Particles Observed in Human Age-Related Nuclear Cataracts Using Mie Scattering Theory," *Investigative Ophthalmology & Visual Science* 48(1):303-213.

Eperjesi, F. et al. (2007). "Reading Performance with Various Lamps in Age-Related Macular Degeneration," *Ophthal Physiol Opt* 27(1):93-99.

International Search Report mailed on Aug. 10, 2012, for PCT Application No. PCT/US2012/34569, filed on Apr. 20, 2012, 4 pages.

Legge, G.E. et al. (1986). "Psychophysics of Reading IV. Wavelength Effects in Normal and Low Vision," *Journal of the Optical Society of America A* 3:40-51.

Ocutech, Bioptic Low Vision Aids for the Visually Impaired, OCUTECH® 2011, located at <http://www.ocutech.com/Products/VES-II>, last visited Sep. 29, 2011, 2 pages.

Remé, C.E. et al. (Jun. 2000). "Apoptosis in the Retina: The Silent Death of Vision," *News Physiol Sci* 15:120-125.

Rubin, G.S. et al. (1989). "Psychophysics of Reading: VI. The Role of Contrast in Low Vision," *Vision Research* 29(1):79-91.

Written Opinion mailed on Aug. 10, 2012, for PCT Application No. PCT/US2012/34569, filed on Apr. 20, 2012, 7 pages.

Yates, J.T. et al. (Mar. 2001) "Acquired (Transient and Permanent) Colour Vision Disorders," Chapter 5 in *Operational Colour Vision in the Modern Aviation Environment*, pp. 43-51.

\* cited by examiner

| Facet | Angle (deg) | Dist of bottom from axis (cm) |
|---|---|---|
| 1 | -36 | -.36 |
| 2 | -30 | -.30 |
| 3 | -23 | -.24 |
| 4 | -16 | -.18 |
| 5 | -6 | -.12 |
| 6 | 1 | -.06 |
| 7 | -1 | 0 |
| 8 | 6 | .06 |
| 9 | 16 | .12 |
| 10 | 23 | .18 |
| 11 | 30 | .24 |
| 12 | 36 | .30 |

HANDS-FREE VISION AID

CROSS-REFERENCE TO RELATED APPLICATIONS

This application claims priority to U.S. Pat. Appl. No. 61/546,011 filed on Oct. 11, 2011, U.S. Pat. Appl. No. 61/526,164 filed on Aug. 22, 2011, and U.S. Pat. Appl. No. 61/477,599 filed on Apr. 20, 2011, each of which is hereby incorporated by reference in its entirety.

BACKGROUND

Progressive vision disorders such as age-related macular degeneration (AMD), age-related maculopathy (ARM) and retinitis pigmentosis (RP) result in a gradual loss of vision which is often accompanied by increased or debilitating sensitivity to light and glare. These conditions make everyday tasks such as reading difficult and uncomfortable, especially over long periods of time.

During the early stages of these vision disorders, eyeglasses of increased strength may provide sufficient visual assistance; however, other vision aids may be necessary in intermediate and late stages of the disorder. Additional vision aids may include a combination of increased magnification and improved lighting to increase contrast. Intense lighting may be provided in combination with glasses to attain the contrast necessary for reading. Lighting solutions that may be used for this purpose include lamps with high illuminance values (~2,000-3,000 lux). Other vision aids that may be used to assist an individual with low-vision may include free-standing lighting, magnifiers, and typoscopes. In some cases, white light-emitting diodes (LED) mounted on eyeglasses, headbands, or lanyards, may be useful. Some individuals may also use display devices where the illuminance of the display may be adjusted, such as closed circuit television systems and electronic book ("e-book") readers.

BRIEF SUMMARY

Described herein are hands-free vision aids that may assist individuals with low-vision disorders such as age-related macular degeneration (AMD), retinitis pigmentosa (RP), and other visual disorders. The vision aids described below may comprise an optical system with one or more light sources configured to provide a well-defined field of illumination bounded by a high contrast perimeter. The optical system of a vision aid may be configured to fit onto or may be integrally formed with an eyeglass frame. The optical system may provide light with sufficiently high illuminance levels that may permit individuals with low-vision to improve reading speed and/or accuracy, while reducing glare. In some variations, a vision aid may comprise an optical system that is configured to provide high illuminance green light in a well-defined field of illumination. The use of light with green wavelengths at high intensity unexpectedly provides improved contrast and comfort for long-duration reading. The optical system of a vision aid may include a tilt adjustment mechanism used to align the illumination field to the targeted viewing region. This may help to ensure that the well-defined field of illumination specifically illuminates the target viewing region (e.g., the text being read) without significantly illuminating peripheral regions. In some variations, the optical system may comprise one or more non-imaging lenses that are configured to provide a uniform, well-defined field of illumination. A vision aid may also comprise a case configured to house a battery, drive circuitry and controls. The case may be mounted on an eyeglass frame or may be remote from the eyeglass frame. Some variations of a vision aid may comprise a clip that allows the optical system to be readily mounted to an eyeglass frame. For example, the clip may be designed for easy use by individuals with limited manual dexterity. A vision aid may comprise one or more wires that connect an optical system with a power supply case that is separate from the optical system and wire-management devices to direct the path of the wires between the optical system and the case.

One variation of a low-vision aid may comprise an elongate housing, a plurality of lensed LED lights located in the elongate housing in a substantially horizontal arrangement, a Fresnel lens in a collimator configuration, with a ridged surface of the lens facing out of the housing and a flat surface of the lens facing into the housing, at least two clips, and a power pack coupled to the elongate housing by electrical wire. The plurality of LED lights may generate a peak intensity of at least 1000 lux. Each of the clips may comprise a superior region tiltably coupled to the elongate housing, an inferior region configured to attach to an eyeglass frame, an anterior surface and a posterior surface between the superior and inferior regions. The elongate housing may protrude anteriorly to the anterior surface of each clip and the elongate housing may be substantially flush with the posterior surface of each clip. The low-vision aid may generate an illumination field comprising a peak intensity, an illumination area that is 40 cm from and perpendicular to the plurality of lights that is no more than 120 cm$^2$, the illumination field comprising a horizontal center line, a vertical center line and a center point at the intersection of the horizontal and vertical center lines. The vertical center line may intersect a superior 10% vertical intensity point and an inferior 10% vertical intensity point. A 50% vertical intensity point of the vertical center line may be located at a distance from the closest 10% vertical intensity point that is no greater than the lesser of 1 cm or one-third the distance from the closest 10% vertical intensity point to the center point. A distance between the superior and inferior 10% vertical intensity points may be smaller than a distance between a first and second 10% horizontal intensity points intersecting the horizontal center line.

In some variations of a low-vision aid, the lensed LED lights may generate light comprising a peak wavelength in the range of about 500 nm to about 550 nm, e.g., 507 nm or 527 nm. The low-vision aid may further comprise a case configured to enclose the power pack and the housing. The elongate housing of the low-vision aid may weigh 20 grams or less.

In another variation, a low-vision aid may comprise an elongate structure with a plurality of light sources, the elongate structure configured to attach to an eyeglass frame such that the elongate structure protrudes posteriorly no more than 1 cm from the eyeglass frame. The plurality of light sources may be configured to generate a green illumination field comprising a peak intensity, an illumination area, the illumination field comprising a horizontal center line, a vertical center line and a center point at the intersection of the horizontal and vertical center lines. The vertical center line may intersect a superior 10% vertical intensity point and an inferior 10% vertical intensity point. A 50% vertical intensity point of the vertical center line may be located at a distance from the closest 10% vertical intensity point that is no greater than the lesser of 1 cm or one-third the distance from the closest 10% vertical intensity point to the center point. A distance between the superior and inferior 10% vertical intensity points may be smaller than a distance between a first and second 10% horizontal intensity points intersecting the horizontal center line. The plurality of lights may comprise a plurality of lensed LED bulbs. The perimeter may comprise a horizontal dimension that is larger than a vertical dimension. The elongate structure may be configured to selectively tilt relative to the eyeglass frame. In some variations, the elongate structure may comprise an elongate housing with an anterior opening, where a Fresnel lens may be located about the anterior opening of the elongate housing. The Fresnel lens may be in a collimator configuration with respect to the plurality of light sources (e.g., where the flat surface lens faces the light sources) or may be in a collector configuration with respect to the plurality of light sources (e.g., where the ridged surface lens faces the light sources). The low-vision aid may be configured to generate a peak intensity is at least 500 lux, and in some cases, at least 1000 lux. The green illumination field generated by the vision aid may comprise a peak wavelength of 507 nm or 527 nm. The low-vision aid may further comprise at least two clips, each clip comprising a loop end coupled to the elongate structure and two clip tips. In some variations, the loop end of each clip may form a friction fit with a retention bar of the elongate structure to provide selective tilting of the elongate structure relative to the at least two clips.

The elongate structure of a low-vision aid may be configured so that, when attached, the elongate structure protrudes posteriorly no more than 1 cm from the eyeglass frame. The elongate structure may be integrally attached to an eyeglass frame. The weight of the elongate structure with the plurality of lights and the Fresnel lens may have a weight of less than 40 grams. A low-vision aid may further comprise a power pack remotely attached to the elongate structure with a power line. The weight of the low-vision aid without the power pack and without the power line may be less than 40 grams. The weight of the low-vision aid without the power pack and without the power line may be less than 20 grams.

Some variations of a low-vision aid may further comprise a reflector having a substantially parabolic shape located within the elongate housing such that the plurality of light sources may be located between the parabolic reflector and the anterior opening of the elongate housing.

One variation of a method for providing illumination may comprise generating a green illumination field from a lighting structure attached to an eyeglass frame. The illumination field may comprise a peak intensity, an illumination area, a perimeter surrounding the illumination area that is 10% of the peak intensity of the illumination field, and a transition that is 50% of the peak intensity and within 1 cm of the perimeter. The perimeter may comprise a horizontal dimension that is larger than a vertical dimension. The method may further comprise tilting the lighting structure relative to the eyeglass frame to reposition the illumination field. In some variations, tilting the lighting structure does not cause posterior displacement of the lighting structure relative to the eyeglass frame. Additionally, the method may comprise attaching the lighting structure to the eyeglass frame using a plurality of attachment structures. The method may also comprise attaching a power source wire to one or both of the arms (e.g., temple arms) of the eyeglass frame. The power source wire may be attached at a first end to the lighting structure and a second end to a power source separate from the lighting structure.

BRIEF DESCRIPTION OF THE DRAWINGS

FIG. 4A depicts LEDs with constant spacing and FIG. 4B depicts LEDS with variable spacing.

DETAILED DESCRIPTION

Figure 1A:
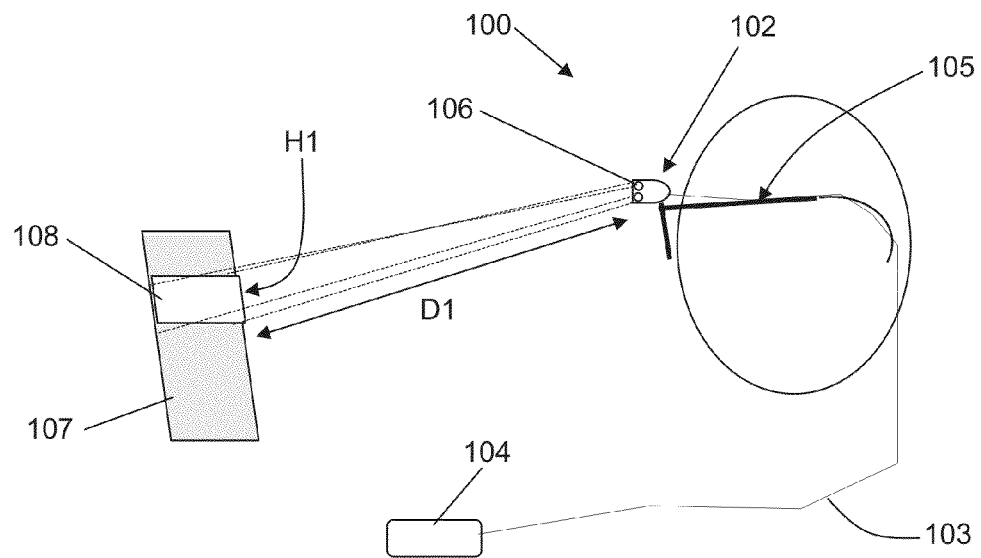
FIG. 1A schematically depicts one variation of a vision aid fitted on a user.

Individuals with vision-related diseases such as AMD, RP, etc. may require various types of visual assistance in the course of the disease. Some studies show that intense lighting (e.g., on the order of 2,000 to 3,000 lux) may provide some improvement in visual acuity ("Reading performance with various lamps in age-related macular degeneration." Eperjesi F, Maiz-Fernandez C, Bartlett H E. Ophthalmic Physiolo Opt. 2007 January; 27 (1):93-9). However, such levels of brightness can lead to discomfort, especially for long-duration tasks such as reading. Also, older individuals with AMD often suffer from other eye disorders such as cataracts or loss of lens clarity, which may cause light scattering in the lens that may reduce contrast sensitivity by flooding the retina with bright background light ("Predicted light scattering from particles observed in human age-related nuclear cataracts using mie scattering theory." Costello M J, Johnsen S, Gilliland K O, Freel C D, Fowler W C. Invest Ophthalmol Vis Sci. 2007 January; 48 (1):303-12.). As a consequence, the retina, and especially the central region that is critical for high acuity tasks such as reading, may be flooded with stray light (e.g., from scattering of the bright light reflected from the full page). Such glare and/or stray light may reduce any improvement in contrast that may be attained from the intense light, or create discomfort that makes long-duration tasks such as reading difficult. Glare that arises from illuminating peripheral regions of the visual field with an intense light may result in reduced contrast sensitivity, comfort and reading speed in individuals with low-vision.

Nevertheless, to achieve higher illumination levels, a free-standing light source may be used. However, such light sources may illuminate the surrounding text and the ambient environment, leading to increased glare and reduced contrast. The glare generated from the illumination of surrounding text may adversely affect comfort, especially over extended periods. It may also be difficult to adjust and/or align the light path of a free-standing light source relative to an individual's visual axis to direct light at a targeted region of text. Even smaller devices, such as headband-mounted or eyeglass mounted lights often create a circular spot of light that is poorly matched to the size of a block of text. On the other hand, increasing the size of the illumination field from a spot to a full line width will illuminate most of the page, and may create a significant amount of uncomfortable glare. Even lanyard mounted lights have been used, but because the location of the LEDs is not registered to the visual axis, it is unable to provide a constrained illumination field and instead will tangentially illuminate an entire page for a light position closer to the abdomen. This further reduces illuminance as the cosine of the angle with respect to the page being read.

Display devices have also been used to assist individuals with vision disorders. For example, closed circuit TV (CCTV) systems may provide increased magnification and may reduce glare (e.g., by inverting colors in the presented image). However, these systems require sitting at a desk and manipulating a stage to move the reading material. Furthermore, monitors often fail to provide sufficient luminance compared to a brightly lit paper page of text. Electronic book readers (e.g., e-book readers) may be able to display text with high contrast and enable the user to adjust the size of the text. However, electronic book readers do not enable the user to read bills, newspapers, and other printed publications. In many cases, such devices are also unable to provide light of sufficient intensity for individuals with AMD.

Described herein are hands-free vision aids that may be used for low-vision reading, and may be configured to provide a field of illumination with high intensity light but without uncomfortable glare. These vision aids may be beneficial for individuals with low-vision disorders such as AMD and RP, and may enable such individuals to read comfortably for extended periods of time. A hands-free vision aid may comprise an optical system that is configured to be mounted on an eyeglass frame. The optical system may comprise two or more LED light sources that are configured to provide light with an illuminance of at least 500 lux or more (e.g., 1000 lux, 1500 lux, 2000 lux, 3000 lux, 3500 lux, or more). The optical system may also comprise one or more lenses that are configured to shape the light from the LED light sources to create a field of illumination of a desired shape and size at a certain distance away from the individual's eyes. For example, the optical system may be configured to create a rectangular field of illumination having a horizontal dimension (i.e., width) from about 10 cm to 30 cm and a vertical dimension (i.e., height) from about 3 cm to 9 cm when measured at a distance of about 20 cm to 60 cm from the individual's eyes or from the illumination source. The field of illumination may have a central portion that has a substantially uniform brightness and may have a high contrast border along the horizontal edges (upper and lower), such that the light transitions from 80% to 20% of the peak illuminance over a distance of no more than 1.5 cm, or from 50% to 10% of the peak illuminance over a distance of no more than about 1 cm. Optical systems may comprise one or more Fresnel lens configured to shape the light from the LED sources to create a rectangular illumination field with a high contrast border. In some variations, a vision aid may have an optical system that comprises one or more LEDs that emit light of a green wavelength (e.g., having a peak wavelength between 460 nm and 560 nm). In some instances, the peak wavelength may be in a narrower wavelength range of 500 nm to 550 nm, or may be at a specific wavelength of 503 nm or 527 nm. The one or more LEDs may all emit light of the same wavelength or one or more LEDs may emit light of a different wavelength from the others.

FIG. 1A depicts one variation of a vision aid for assisting individuals with low-vision. A vision aid 100 may comprise an optical system 102 and a power pack 104. The optical system 102 may comprise one or more light sources 106 and one or more lenses (not shown) to shape the illumination field 108 of the light. For example, the field of illumination 108 may be rectangular with a width W1 and a height H1. The width W1 may be, for example, at least as wide as the width of a piece of paper 107 (e.g., 8 cm, 10 cm, 15 cm, 20 cm, 25 cm, etc.). The height H1 may be less than half the length of the piece of paper (e.g., less than 30 cm, less than 20 cm, less than 10 cm, etc.). The illumination field 108 may have such dimensions and border contrast properties at a viewing distance D1 away from the light sources 106, where D1 may be from about 20 cm to about 60 cm, for example, 30 cm or 40 cm. The optical system 102 may be configured to be mounted onto eyeglass frame 105, either by clipping the optical system onto the frames or by integrating the optical system into the glasses (e.g., in the upper cross-member). In the latter case, an optician or optometrist may fit the glass frames with lenses after the optical system is integrated therein. The light sources 106 of the optical system 102 may comprise an array of light-emitting diodes (LEDs), which may be in compact surface mount packages. In some variations, LEDs may comprise lenses integrated into the LED package. Alternatively or additionally, the optical system 102 may also comprise a Fresnel lens or mirror. In some variations, a Fresnel lens combined with the LED package lenses may form a rectangular illumination region with a height that is significantly less than the height of a standard 8½×11 inch page at a viewing distance of about 40 cm.

Figure 1B:
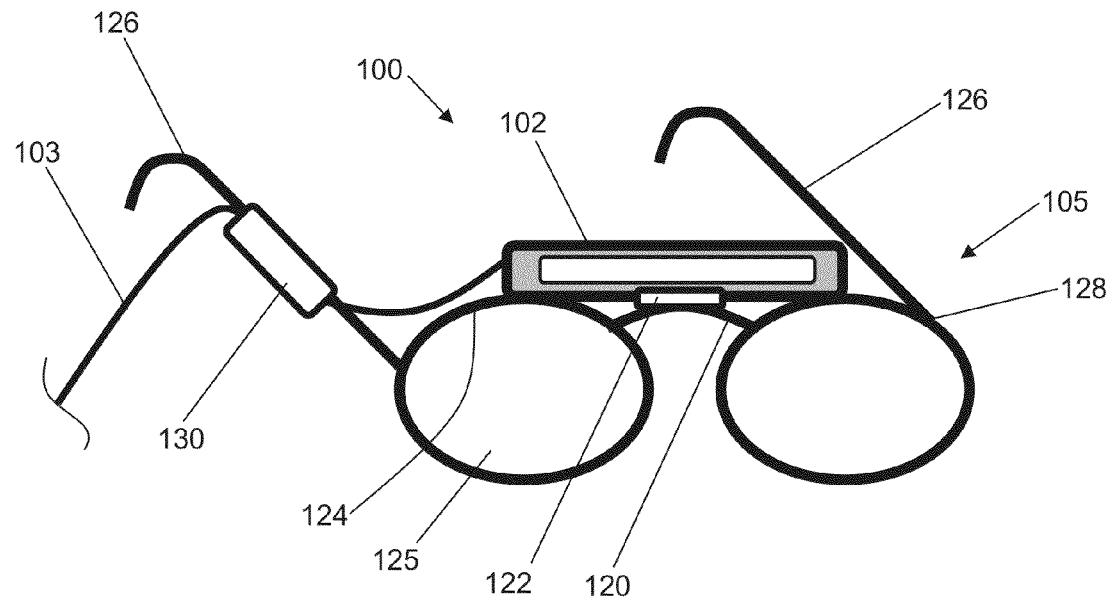
FIG. 1B schematically depicts eyeglasses provided with another variation of a vision aid.

FIG. 1B is a front perspective view of the visual aid 100 coupled to the eyeglass frame 105. The eyeglass frame 105 may comprise a bridge 120, two rims 124 for retaining lenses 125, and two temple arms 126 for supporting the lenses and engaging a user's ears. The temple arms 126 may be rotatably coupled to the rims 124 by a hinge mechanism on either side of the eyeglasses 128. In some variations, the hinge mechanism may comprise a spring. The optical system 102 may be mounted at a central portion of the eyeglass frames. For example, the optical system 102 may be mounted on a bridge 120 of the eyeglass frame 105, using a pivotable attachment mechanism 122. The attachment mechanism 122 may be any of the attachment mechanisms described below, and configured to be tilted by a user to direct the illumination field to the targeted reading region. While the attachment mechanism 122 is shown as being coupled to the bridge 120, it should be understood that an attachment mechanism may engage with any portion of the eyeglass frame or lens. For example, the attachment mechanism 122 may engage one or both of the top of the rims 124 that retain the lenses 125, and in some variations, may engage the bridge 120 and the top rims 124. Alternatively or additionally, the optical system 102 may be coupled to either side of the eyeglasses 128 (e.g., at lateral sections of the eyeglass frames, along a length of the temple arms 126), at or adjacent to the hinge mechanism. In some variations, the temple arms 126 and bridge 120 may be directly connected to the lenses 125 without the aid of the rims 124. For such rim-less glasses, the optical system 102 may be directly coupled to the lenses. The communication cable 103 may be coupled to a wire guide 130, which may releasably secure the cable 103 along the eyeglass frame 105 and to avoid visual obstruction by the communication wire 103. In some variations, the attachment mechanism 122 and/or optical system 102 may have one or more grooves or protrusions to enable a user to manually tilt the optical system 102. This may permit the user to adjust the position of the illumination field to a targeted reading region. The optical system may also be tilted using electronic controls.

The illumination field created by a vision aid may have a region of high luminance that is bordered by a high contrast edge such that the peripheral regions have substantially low luminance. For example, the region of high luminance may have a peak luminance value, and the luminance of peripheral regions outside the boundaries of the high luminance region may be less than 10% of the peak luminance. This may allow for improved contrast sensitivity in a targeted viewing region while reducing glare light reflecting off peripheral regions. Limiting the size of the illumination field to rectangular bar may also permit the vision aid to provide high intensity light without a prohibitively large number of LED light sources. For example, a LED light source provides that 15 lumens/watt operating at 3.6 volts and 37 mA may have a light output of about 2 lumens. Illuminating the entire area of a 8½×11 in (21.5 cm×28 cm) page at 3500 lux (lumens/m$^2$) may use 110 LEDs, but illuminating a rectangular band 4 cm high and 17 cm wide to 3500 lux may use only 12 LEDs. The latter not only reduces glare illumination, but also is far less costly and consumes only 10% of the power, providing a 10× improvement in battery life. In some variations, the number of LEDs used in the vision aid may be 3, 4, 5, 6, 7, 8, 9, 10, 11, 12, 13, 14, 15, 16, 17, 18, 19, or 20. Each LED may be identical, or one or more LED's may be different in peak wavelength(s), peak illuminance, etc.

The vision aid may be configured to create a field of illumination where the brightness within that field is substantially uniform. A rectangular field of illumination with high contrast borders and a substantially uniform level of brightness may reduce glare and provide for better reading comfort. In some variations, an optical system of a vision aid may provide better than ±25% uniformity within the high contrast borders of the illumination field. For example, the illuminance distribution along a vertical and/or horizontal dimension of the portion of the illumination field within the high contrast borders may be such that the lowest illuminance and the highest illuminance levels may not differ by more than 25%.

Figure 2A:
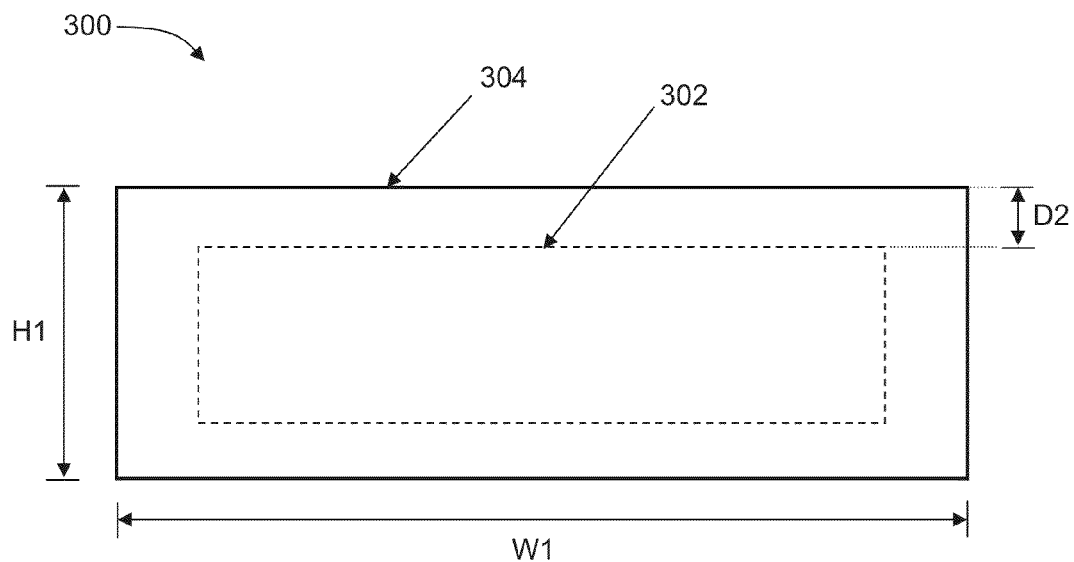
FIG. 2A schematically depicts one example of a field of illumination produced by a vision aid described herein.

In the preferred embodiment, a vision aid may create a field of illumination that is a rectangular band 300 with a high contrast border, where the illuminance of the light from the inside of the rectangle along a vertical dimension (e.g., height) transitions from the peak illuminance to 10% of the peak illuminance over a distance D2 of no more than 1.5 cm, as schematically depicted in FIG. 2A. For example, the portion of the illumination field with the peak illuminance may have a border 302, outside of which the illuminance value begins to decrease. A border 304 may delineate the portion of the illumination field where the illuminance is at 10% of the peak illuminance. The distance D2 between the borders 302 and 304 at any point around the perimeter of the borders may be less than 1.5 cm. The border 304 of the rectangular band may delineate a perimeter such that the band has a height H1 of about 6 cm and a width W1 of about 20 cm. In the vertical dimension (e.g., the dimension perpendicular to the lines of text) of the preferred embodiment, the illuminance may be at least 50% of the peak illuminance no further than 1 cm within the edge of illuminated region (e.g., no more than 1 cm within the border 304), and should be less than 10% of the peak illuminance no further than 1 cm beyond the edge of the illuminated region (e.g., no more than 1 cm beyond the border 304). Additionally or alternatively, the illuminance of the light from the inside of the rectangle along a horizontal dimension (e.g., width) may transition from the peak illuminance to 10% of the peak illuminance over a distance of no more than 1.5 cm. While FIG. 2A depicts the borders delineating regions of varying intensity as uniform relative to each other and where the distance between the borders is consistent along the perimeter of the border, it should be understood that such borders may have non-uniform locations with respect to each other, where the distance between the border is not consistent along the perimeter of the border.

Figure 2B:
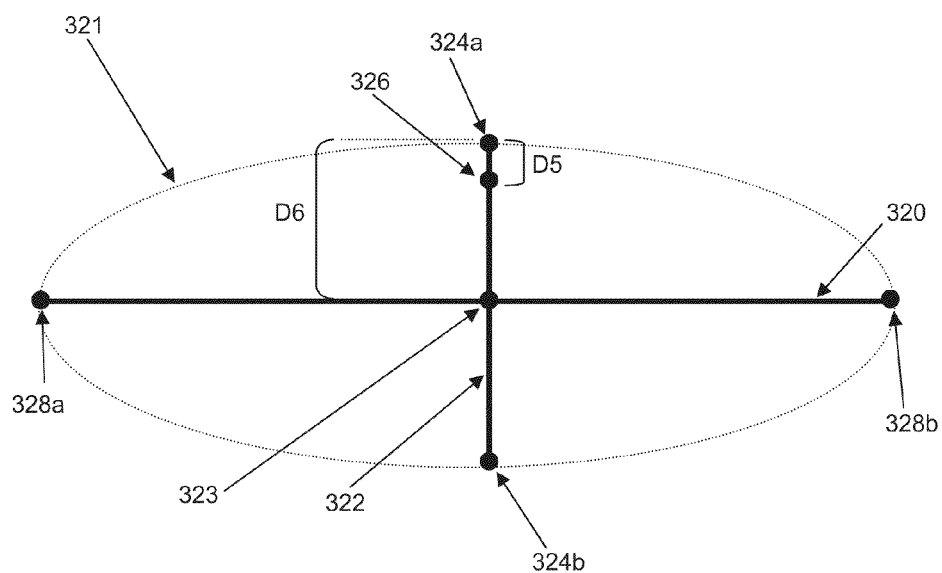
FIG. 2B schematically depicts the illumination distribution for a field of illumination produced by a vision aid.

FIG. 2B depicts an illumination field 321 comprising a horizontal center line 320, a vertical center line 322 perpendicular to the horizontal center line 320, and a center point 323 at the intersection of the horizontal and vertical center lines. For horizontally and vertically symmetric illumination fields, the horizontal and vertical center lines 320 and 322 split the illumination field into subfields of equal size and shapes, independent of the relative orientation and/or absolute position of the illumination field (e.g. a tilted rectangular shape off-axis from the user's eyeglass frame or the user's visual field axes). In other variations, where the illumination field is not horizontally and/or vertically symmetric, the center lines may be lines which split the illumination fields into different shapes of equal area, or provide the best fit of the perpendicular horizontal and vertical reference lines that minimizes difference in area between the regions split by the vertical reference line and the difference in area between regions split by the horizontal reference line. The illumination field 321 may have region having a peak intensity in a central portion of the field 321, for example, in or around the center point 323. The vertical center line 322 may intersect a portion of the illumination field with an intensity that is 10% of the peak intensity. For example, the vertical center line 322 may intersect a superior 10% vertical intensity point 324a and an inferior 10% vertical intensity point 324b. The vertical center line 322 may also intersect a portion of the illumination field with an intensity that is 50% of the peak intensity. For example, the vertical center line 322 may intersect a 50% vertical intensity point 326. The distance D5 is the distance between the 50% vertical intensity point 326 to the closest 10% vertical intensity point along the vertical center line 322. The distance D6 is the distance between the closest 10% vertical intensity point to the center point 323 along the vertical center line 322. The distance D5 is no greater than the lesser of 1 cm or one-third the distance D6. In some variations, D5 may be from about 0.9 cm to about 0.4 cm, and D6 may be from about 1 cm to about 6 cm. The horizontal center line 320 may intersect 10% horizontal intensity points 328a, 328b. The distance between the 10% vertical intensity points 324a, 324b may be less than the distance between the 10% horizontal intensity points 328a, 328b. The intensity of illumination bounded by the 50% intensity points on either the may be generally uniform, as described above.

Figure 2C:
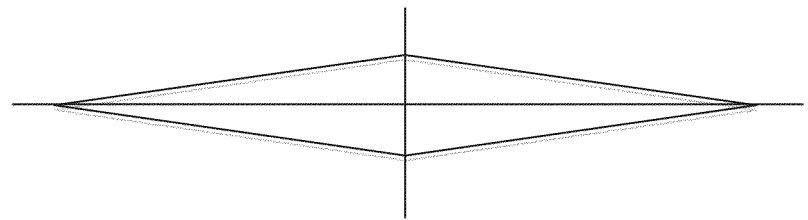
FIGS. 2C-2E depict illumination fields with different shapes.
Figure 2D:
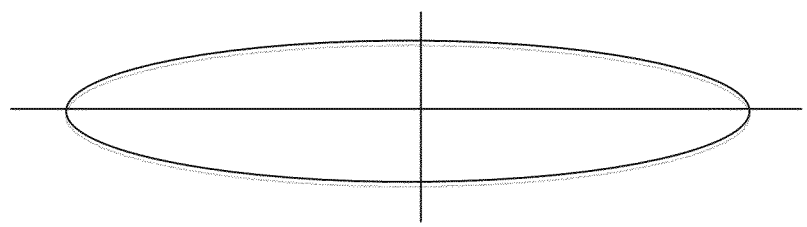
Figure 2E:
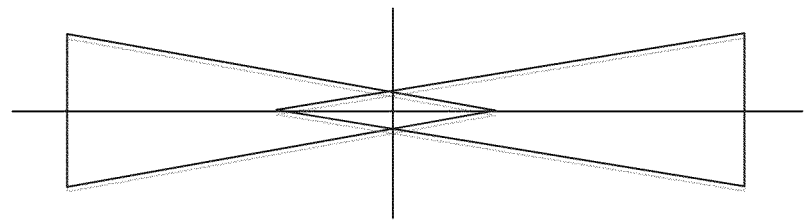

Other embodiments may create an illumination field with substantially rectangular regions, having a shape similar to trapezoids, parallelograms, or the like. In other variations, the illumination field may also have an oval, ellipse, or any shape where the width is substantially greater than the height. The illuminance distribution across the illumination field (e.g., along the horizontal and/or vertical center lines) may be similar to the distribution described in FIG. 2B. For example, FIG. 2C depicts a diamond-shaped illumination field, FIG. 2D depicts an elliptical illumination field, and FIG. 2E depicts overlapping two triangles that form an illumination field where the width is substantially greater than the height. Regardless of the geometry of the illumination field, the illumination field should not occupy more than half of the height of a page to be read (e.g., a 8½×11 in page), and may be such that no more than half of the height of a page is illuminated with an intensity greater than 10% of the peak illuminance. For example, the height of a rectangular illumination field may be less than 40%, 30%, 20%, or 10% of the height of the page, and no more than 40%, 30%, 20%, or 10% of the height of the page may be illuminated with an intensity greater than 10% of the peak illuminance. The width W1 of the vertical borders may be equally as wide or wider than the width of the page to be read. For example, the width of the illuminated band may be greater than the page width, but the height of the illuminated band may be substantially less than half the height of the page. In some variations, a field of illumination that has a width W1 equally as wide or wider than the page to be read may have vertical borders that are of lower contrast than the horizontal borders. The optical system may be tailored to create an illumination field that illuminates the line being read, plus a small band on each side to account for small movements of the page. Such a band may be about 3 cm to about 5 cm wide, e.g., about 4 cm wide.

A vision aid may comprise an optical system that is configured to create a field of illumination with a high contrast border as described above. One variation of an optical system may comprise a Fresnel lens and an array of LEDs. For example, an optical system may comprise a non-imaging cylindrical Fresnel lens and an array of lensed surface mount LEDs (Osram TopLED). Lensed LEDs may have an angular spread of ø=±20° with respect to the optic axis (measured at the point where the light intensity is 30% of the intensity at the optic axis), which may restrict the width of the light beam in the axis parallel to the line of text (e.g., a horizontal direction). The spread of the beam may be d*tan(ø), where d is the distance between the LED emitter and the page being read. For example, where the distance d is about 40 cm, the beam width may be about ±14.6 cm. Where the distance d is about 20 cm, the width may be about ±7.3 cm. Thus, a suitable beam width can be obtained without focusing in the axis parallel to the line of text. A Fresnel lens may be used to limit the height of the illuminated field.

In some variations, the Fresnel lens may be a positive focal length lens used in a collector configuration (i.e. the ridged lens surface faces the light source and the flat lens surface faces the text). In other variations, the Fresnel lens may be used in a collimator configuration (i.e. the flat lens surface faces the light source and the ridged lens surface faces the text), similar to traditional lighting uses of a Fresnel lens, such as in a lighthouse or automobile light. Additionally or alternatively, the optical system may also use a negative focal length Fresnel lens or a diverging lens, so the area of the field of illumination becomes gradually larger as the distance from the lens increases. This may help reduce the change in field size over the range of distances that users may need (typically 20-40 cm). This may be preferred over a converging lens, which must go through a focus and then diverge at a greater angle. While the lens may have 12 facets, more or less facets may be used. Fewer facets (e.g., 6, 8, 10) may limit the ability of the lens to focus, but may increase the machining tolerances and number of facet points and transition regions between facets. Facet points scatter light and reduce the lens effectiveness, and the slope of the transition region must be vertical or it represents lost lens area that cannot provide focusing. In other variations, the Fresnel lens may include additional facets for attaining a sharper focus, improved uniformity and/or achieving a flatter lens surface.

Figures 3A, 3B:
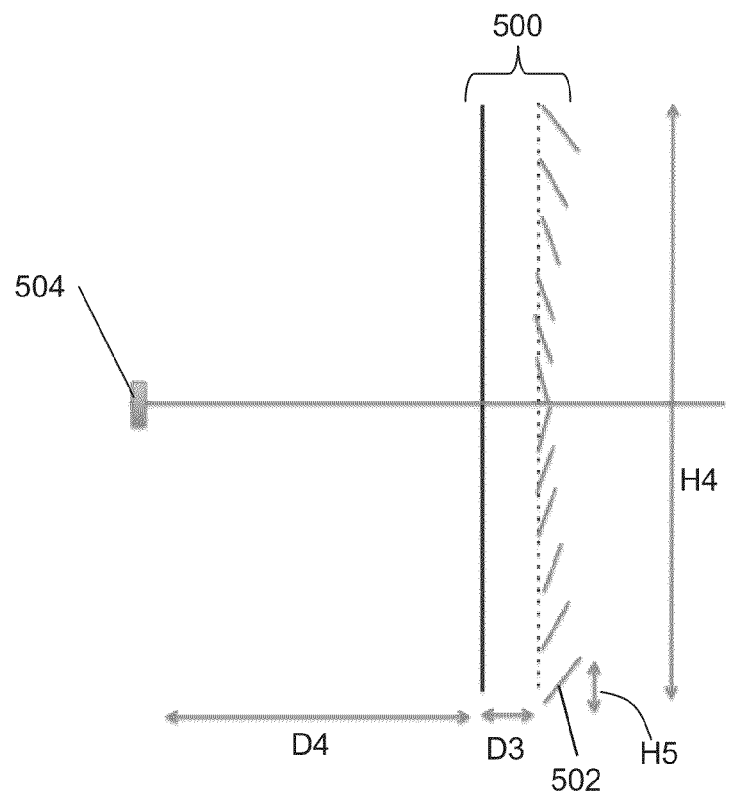
FIG. 3A schematically depicts one variation of a non-imaging lens design for an optical system.
FIG. 3B is a table that provides examples of facet angles of the non-imaging lens depicted in FIG. 3A.

FIGS. 3A and 3B show one Fresnel lens design that may be suitable for this purpose. The lens 500 may have a height H4 (where H4 may be from about 0.5 cm to about 1 cm, e.g., 0.72 cm) and a thickness D3 where D3 may be from about 0.015 cm to about 0.3 cm, e.g., 0.02 cm). The lens 500 may have a plurality of facets 502 (e.g., 4, 6, 7, 10, 12, 16, etc.), where the height of the facets H5 may be from about 0.01 cm to about 0.2 cm, e.g., 0.06 cm. A LED 504 may be located at a distance D4 from the back of the lens 500, where D4 may be from about 0.25 cm to about 1 cm, e.g., 0.82 cm. The angles of each facet may vary along the height of the lens, and in some variations, may have the angles as tabulated in FIG. 3B. For example, the lens 500 may have 12 facets with all the same height H5. The angles in the table are measured with respect to the vertical direction, so a facet (parallel to the face of the lens has an angle of 0 degrees). The surfaces of positive angle facets may have a negative slope, while the surfaces of negative angle facets may have a positive slope. The slope angle and draft angle of the facets, as well as the spacing between the facets, may be varied to shape and direct the LED light such that a rectangular illumination field is created. Fresnel lens may comprise linear facets as described here, but may additionally or alternatively comprise curved facets, total internal reflection-type prisms, and the like. In some variations, a Fresnel lens may comprise one or more faceted regions (e.g., on the periphery of the lens) and smooth regions (e.g., in a central portion of the lens).

Figure 3C:
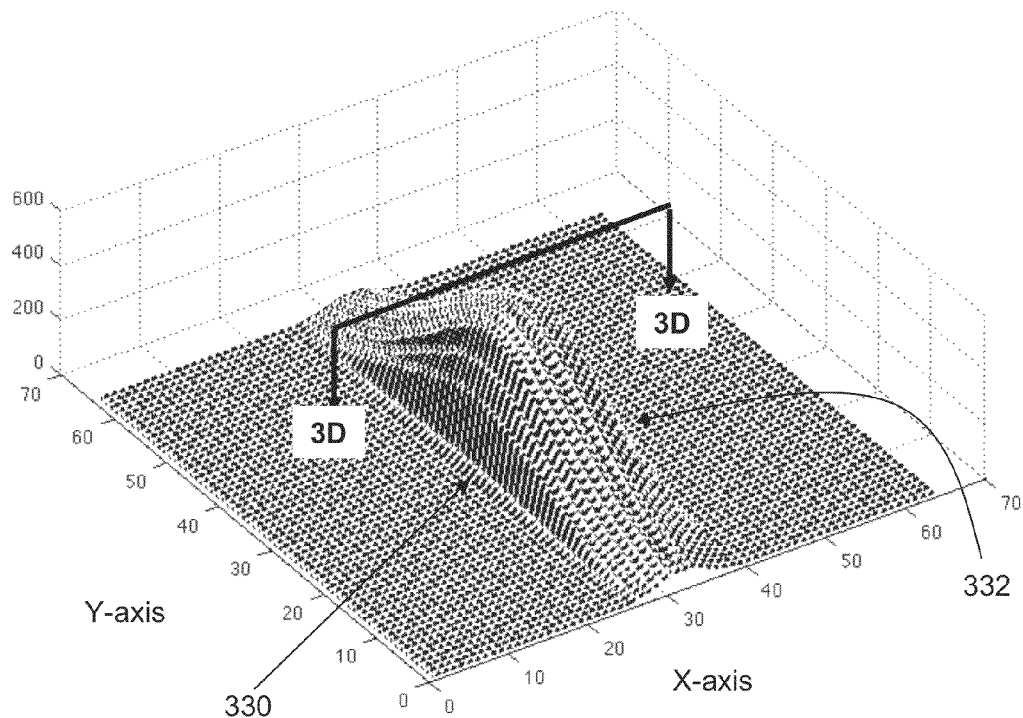
FIG. 3C is a contour plot that represents the light distribution that may be attained using the non-imaging lens of FIG. 3A with facets defined by the facet table in FIG. 3B. Each unit on the X-axis and the Y-axis represented 0.5 cm (e.g., 60 units represents a dimension of 30 cm), and the Z-axis is the relative intensity.

In some variations, lenses for optical systems in vision aids may be designed using computer code that traces rays through the facets to the image plane. For example, the computation may assume the use of a lensed LED source, such as a linear array of 12 TopLED green LEDs with a center-to-center spacing of 0.5 cm (which may have a spherical lens with a radius of 1.28 mm). The computer code may trace the rays from the LED array onto a grid with elements having a size of 0.5 cm×0.5 cm. Various features of the lens facets (e.g., number of facets, facet slope angles, facet draft angles, spacing, etc.) may be varied by the computer code to generate an output that represents the uniformity of an illumination field. The computer code is configured to trace rays from the source LED to the flat surface of the lens, scaling intensity for emission angle and incidence angle. The rays may be refracted through the flat surface, faceted surface, and to the plane of the reading surface at a distance of 40 cm from the plane defined by the bottom of the facets. An example output based on the lens design shown in FIGS. 3A and 3B is shown in FIG. 3C, with a scale of 0.5 cm per unit in both axes, so that the extent is 30×30 cm. This lens design may enable a sharp cut-off (e.g., high contrast) at the boundary of the illuminated region. A novel feature of the lens is the use of reverse-angle facets (facets 6 and 7 in the lens angle table in FIG. 3B). Normally, the facet angles go through a monotonic progression from most negative to most positive, as would be done for an imaging lens. Reversing the angles enables a portion of the light to be directed to fill in gaps in the pattern, providing a flatter light distribution while retaining a sharp drop in intensity at the boundary. Fresnel lenses may have straight or curved facet surfaces, as may be desirable. As may be seen in the FIG. 3C contour plot, the dimension of the illumination field along the X-axis (i.e., vertical direction) is substantially less than the dimension of the field along the Y-axis (i.e., the horizontal direction).

Figure 3D:
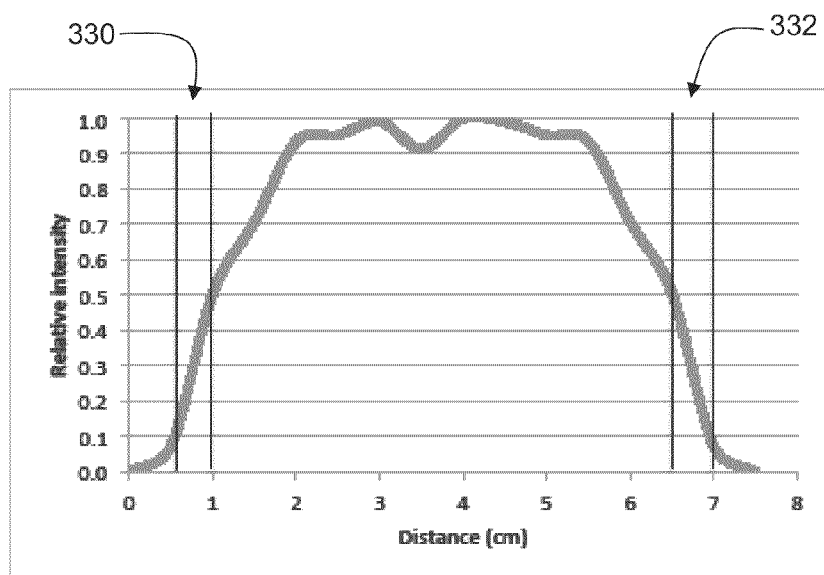
FIG. 3D depicts a graph showing the relative light distribution at a plane normal to a Fresnel lens that conforms to the design depicted in FIGS. 3A and 3B.

The intensity profile through the center of the contour plot (marked by line 3D-3D) is shown in the graph shown in FIG. 3D. The X-axis of the FIG. 3C contour plot corresponds to the X-axis (distance in cm) of the FIG. 3D graph. As depicted there, at a bottom border 330 of the field, the relative intensity rises from about 10% of the peak illuminance to about 50% of peak illuminance over a distance of about 0.5 cm (i.e. from the 0.5 cm location to the 1 cm location on the X-axis). At a top border 332 of the field, the relative intensity decreases from 50% to about 10% of the peak over a distance of about 0.5 cm (i.e., from the 6.5 cm location to the 7 cm location on the X-axis). The width of the profile between the 10% points (i.e., between the bottom border 330 and the top border 332) is about 6.5 cm. The graph in FIG. 3D may represent the relative light distribution at a plane normal to a Fresnel lens located about 40 cm from the Fresnel lens outer face (e.g., where the outer face is faceted) using the computer code described above.

In one embodiment, a linear Fresnel lens may be used to focus the light from the LEDs onto the page. In another embodiment, the Fresnel lens may have circular focusing regions corresponding to each LED. In the preferred embodiment, the Fresnel lens may be ruled over its full surface, with no unruled regions at the top or bottom. This is may help to eliminate unfocused light from passing around the ruled region, which would create a lit band above and below the borders of the illumination field. In another embodiment, the Fresnel lens may have unruled regions at the top or bottom, and baffles may be included to block light from passing through the unruled areas. The baffles may be physical elements such as metal or plastic pieces, or may be paint applied to unruled surfaces.

In some variations, the Fresnel lens may have rulings on it, where the facets are configured to focus light by refraction. A linear lens may have facets that form straight lines along the length of the lens. In some variations, the Fresnel lens may be rectangular in shape. The rulings in some embodiments need not be linear. For example, circular rulings in front of each LED may act to focus each LED separately. The lens can also have a mix of linear and circular rulings. For example, the central portion might be linear, with circular or curved rulings near the ends to improve uniformity.

In one embodiment, the LED light sources may be mounted in line along an axis parallel to the top frame member of the glasses. The array may have a length of greater than or equal to 7 cm, and may include at least four LEDs in order to provide sufficient illuminance, which may be greater than or equal to 500 lux, and preferably greater than 1000 lux. In one embodiment, the LEDs are white. In another embodiment, they may be green with peak wavelength in the range of 460 to 560 nm, or a range of 500 to 550 nm, with preferred peak wavelengths of 507 or 527 nm (corresponding to the peak sensitivity of the retinal rods and M-cones respectively). The LEDs may have an emission half-angle of greater than or equal to 20° with respect to the optic axis, measured at the point where the light intensity is 30% of the intensity at the optic axis. The choice of wavelength may depend on the disease condition, as indicated in the results presented below. In some variations, the LEDs used may comprise non-red wavelengths. In other variations, LEDs with wavelength shorter than 500 nm may be used, as may be desired, although use of blue light has been associated with ocular disease or damage. In another embodiment, LEDs of multiple colors are mixed in the array, for example, alternating LEDs with 503 nm and 527 nm peak emission wavelengths. Without being bound by theory or hypothesis, non-red light, or green light may provide improved visual acuity and/or reduced glare sensitivity over red light because the vascularized retinal tissues are red. Accordingly, these tissues scatter red light, but absorb green light (which gives rise to their red color). For example, if stray light has a red component (e.g., white light), the retinal tissues will scatter and reflect the red light within the eye. Monochromatic light, and/or light where the red component has been filtered out, may be less susceptible to such intraocular scattering.

Figure 4A:
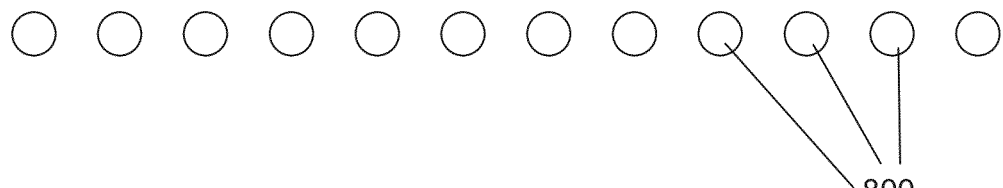
FIGS. 4A and 4B schematically depict various ways in which the light-emitting diodes (LEDs) of a vision aid may be spaced.
Figure 4B:
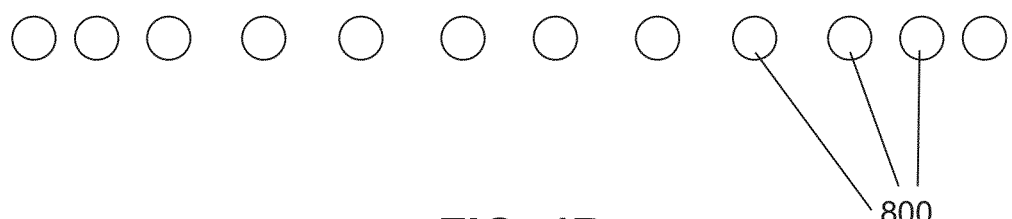

Light sources of an optical system for a vision aid may be arranged in any suitable fashion to produce a rectangular field of illumination with high contrast borders. In one embodiment, the spacing between light sources 800 (such as LEDs) is constant spacing along a linear axis, as shown in FIG. 4A. In another embodiment, the spacing between the light sources 800 is not constant, but may be smaller near the ends of the array, as shown in FIG. 4B. Non-constant spacing of the light sources in this manner may help provide a field of illumination with a substantially uniform brightness. The light from adjacent light sources may overlap so that the center of the lit region on the page is illuminated by more light sources than the ends of the lit region. It is also possible to displace certain light sources a small amount (typically <1 mm) above or below the axis of the light source array to improve uniformity. The spacing between the light sources may be about 0.3 cm to about 2 cm, for example, 0.64 cm (12 LEDs in 7 cm array).

The lenses and optical components of a vision aid may be configured to control the incidence of stray light. Stray light may give rise to the formation of illumination bands or regions outside of the central band, which may adversely affect the visual comfort of the individual. The number of facets of a Fresnel lens may be selected to reduce the number of transitions between facets, which may help reduce the effects of stray light on the illumination field. In some variations, un-ruled regions of the lens may be blocked to help prevent light transmission through regions that will not provide a focus. The blocking may be accomplished with a baffle or paint.

Figure 5:
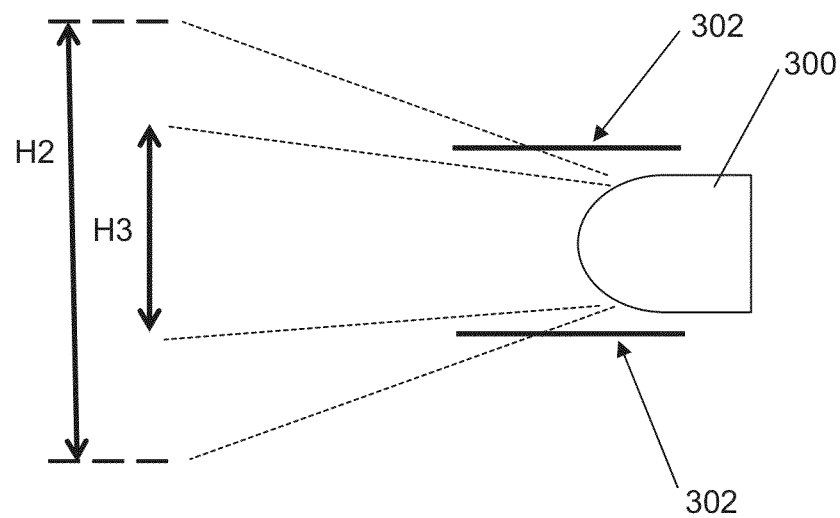
FIG. 5 schematically depicts an example of a baffle that may be used with a vision aid to provide a rectangular area of illumination.

One embodiment of an optical system may comprise a baffle 302, as shown in FIG. 5. The baffle 302 may comprise of strips made out of, for example, heavy gauge aluminum foil or plastic, one above the row of LEDs 300 and one below. This may block rays at wider angles to reduce the height of the illuminated region, which may help form a rectangular illumination pattern. For example, without the baffle 302, the illumination from the light source 300 may have a height H2, where H2 may be from about 7 cm to about 20 cm. With the baffle 302, the illumination may have a height H3, where H3 may be from about 6 cm to about 12 cm. The illumination from individual light sources may overlap to provide uniform illumination along the horizontal dimension. Light sources such as LEDs may have a circular illumination field, and the overlap of the illumination fields from multiple LEDs may form a rectangular illumination field with substantially uniform intensity. The strips of the baffle 302 may have a black matte coating to reduce stray reflections.

Figure 6:
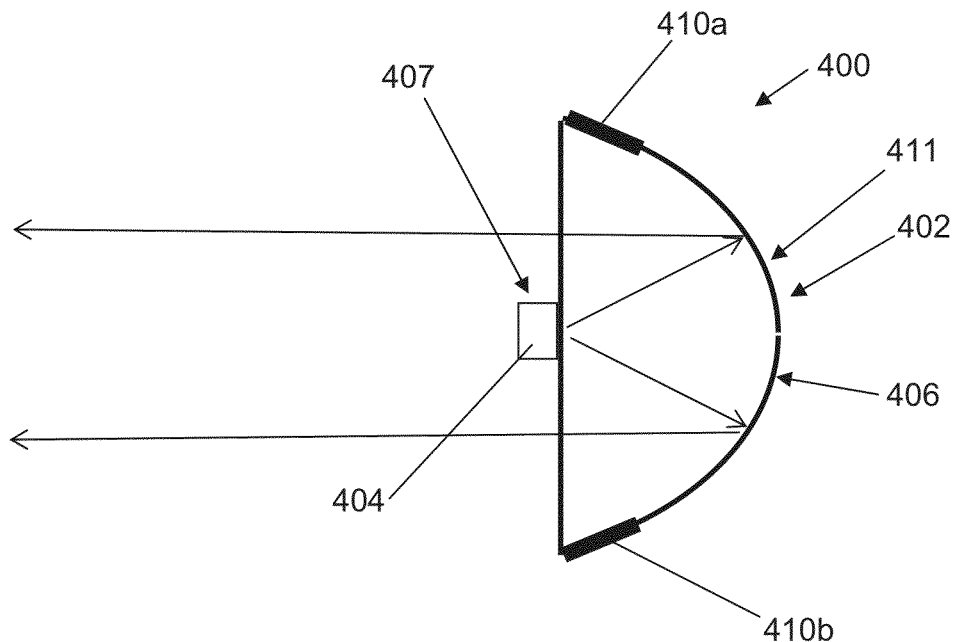
FIG. 6 schematically illustrates one example of an optical system comprising a light source and a parabolic or circular cylinder.

In another embodiment, an optical system may comprise a compact illuminator 400 comprising a cylindrical reflector with a parabolic or spherical curved surface 406. The light sources 404 may be surface-mount LEDs mounted at the focus 407 of the parabolic reflector 406 (FIG. 6), or on the axis of symmetry half way between the center and reflective surface of a spherical reflector 408. In one embodiment, the reflector is a solid element and the LEDs are bonded to the flat surface. In another embodiment, the reflector is a hollow element, which may be formed by extrusion or by bonding a flat faceplate to a cylindrical reflector element. In another embodiment, there is no flat faceplate, and the LEDs are mounted on a bracket.

The ends of a reflector 402 may be opaque to prevent emission of stray light. Portions of the surface may also be blackened or opaque to eliminate reflections from those surfaces or corners or edges. In the example depicted in FIG. 6, the opaque region may be located near the ends of the arc, to prevent reflection from the ends or from regions where aberrations are most severe. For example, the parabolic reflector 406 may have a first opaque region 410a on a first end of the reflector and a second opaque region 410b on a second end of the reflector.

The parabolic reflector 406 may have a reflective surface 411. The reflective surface may be coated with a reflective material. The reflective coating may be applied to the surface in several ways. In one embodiment, an aluminized mylar film may be bonded to the surface of the reflectors. In another embodiment, a plastic reflector may be coated with a metal such as aluminum. In another embodiment, the reflector may be made of polished aluminum. In some variations, the reflector may be a mirror.

Figure 7:
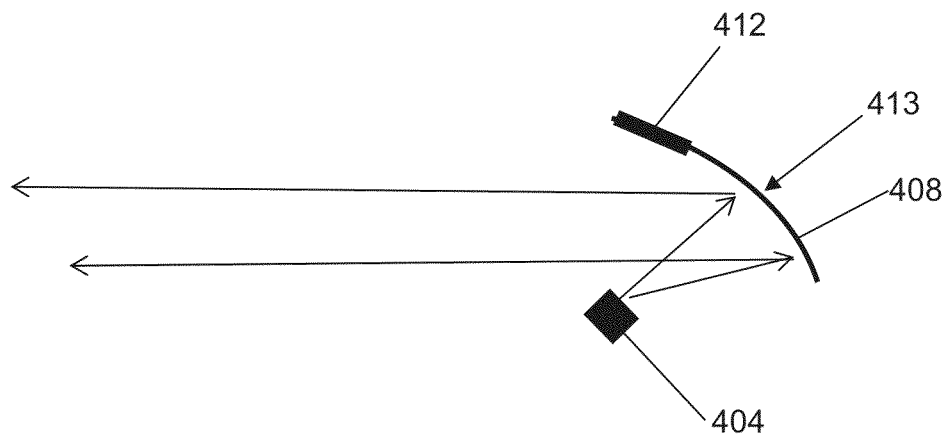
FIG. 7 schematically illustrates another example of an optical system comprising a light source and a parabolic or circular cylinder.

While an optical system may use a parabolic reflector, other variations may use reflectors with non-parabolic curve, such as spherical curves, or straight segments that approximate a parabola. One variation of a parabolic compact reflector with an asymmetric surface is shown in FIG. 7. The reflector 408 may have an off-axis spherical or parabolic surface and may be a segment or arc of the parabolic or spherical surface shown in FIG. 6. Accordingly, the arc reflector 408 may be smaller than the reflector 406 of FIG. 4. The LED is tilted so that it views the reflective surface over an angle equal to or greater than the emission angle. For example, a lensed surface mount LED 404 may have an emission angle of 20° (±10°), so the LED is tilted to view the reflective surface 413 over that range of angles. The arc reflector 408 may have an opaque region 412 on one end of the reflector to reduce stray reflections. A potential advantage of this embodiment is that the LEDs can be mounted to a bracket independent of the reflector, and the LEDs are not in the way of the emerging rays. An arc reflector may also allow the use of more types of LED mounts and packages, since an arc occupies less of the angular space around the LED than a parabolic reflector that may occupy a substantial portion (e.g., 180 degrees or more) of space around the LED. Additional angular space between a LED and the reflector may allow for a greater range of LED placement without interfering with the light path. For example, a LED with a larger package may not be used with a full parabolic reflector, but such an LED may be used with an arc reflector.

While the LED may be mounted such that the LED emitting surface is at the focus of the parabolic reflector or at the midpoint of the radius of a spherical reflector, it should be understood that the LED may be mounted at any location with respect to the reflector. For example, the LED location may be offset from the focus and/or midpoint (e.g., on the order of ±10%).

Figure 9A:
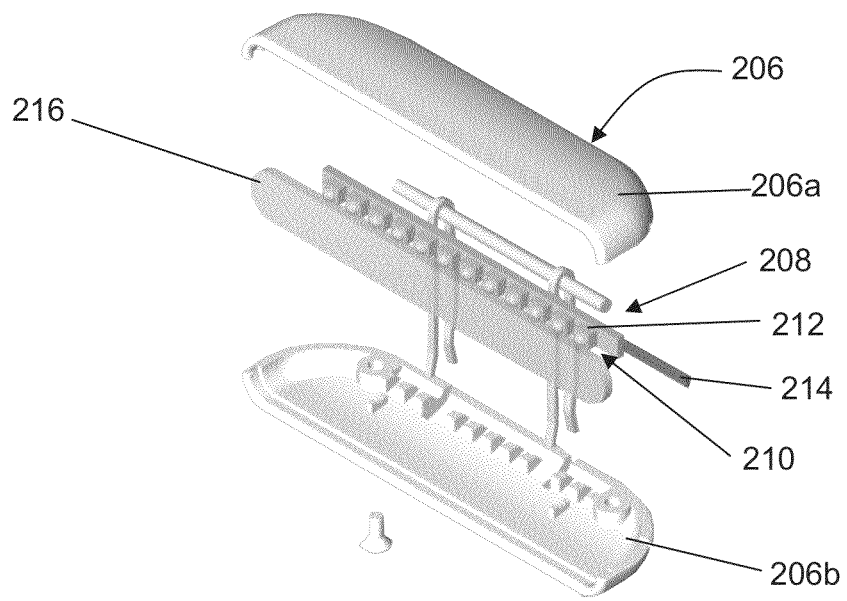
FIGS. 9A and 9B are exploded views of one variation of an optical system that may be used in a vision aid.
Figure 9B:
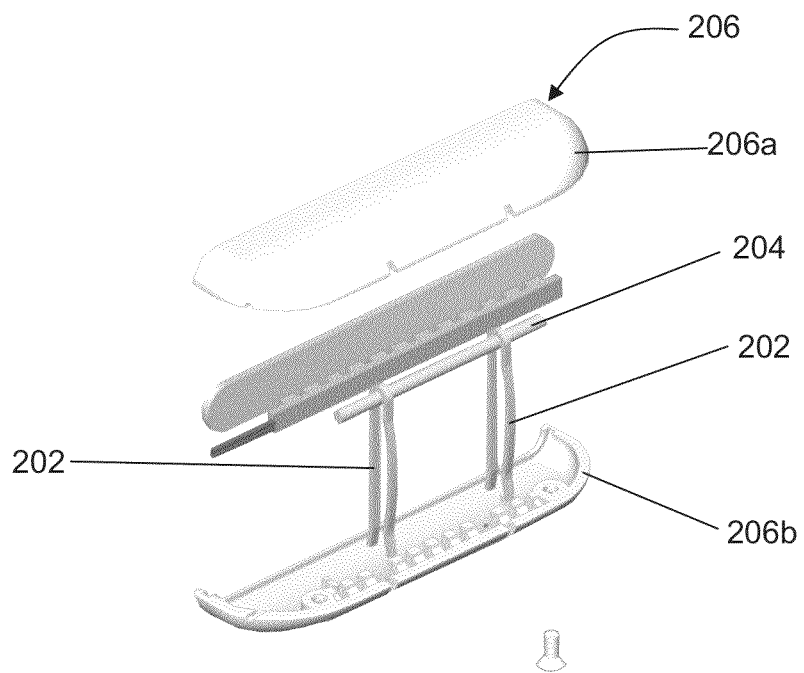

The optical system of a vision aid may be retained within a housing, which may stabilize the optical components and permit the optical system to be mounted to an eyeglass frame. FIGS. 9A and 9B depict one example of an elongate housing 206 that comprises two shells 206a and 206b that attach (e.g., by one or more screws, and/or snap-fit, friction-fit, etc.) and form a volume in which an optical system 208 may be retained. The optical system 208 may comprise a linear LED array 210 on an elongate substrate 212. The optical system may also comprise a Fresnel lens 216 to shape the light emitted by the LED array. The elongate substrate 212 may be made of a rigid material and may provide an interface between the LED array 210 and a communication cable 214 that connects the LED array to a power pack and user controls. The location of the Fresnel lens 216 may correspond to the location of the LED array, which may act to protect the LED array while transmitting the LED light. The housing 206 may also have grooves and apertures that accommodate an attachment mechanism that may be used to mount the optical system to an eyeglass frame. Attachment mechanisms may be configured to permit tilting and/or rotation of the optical system after the optical system is mounted on an eyeglass frame, so that a user may adjust the angle and location of the field of illumination. Various examples of attachment mechanisms are described below.

The vision aids described herein may be used alone or in combination with other vision aids. For example, the vision aid may be used with a light source that provides dim ambient light. In other cases, the vision aid may be used in a dim room (e.g., a room with shades closed, or a level of lighting sufficient to navigate safely) without supplemental illumination from fixtures, lamps, windows, etc.

Figure 8A:
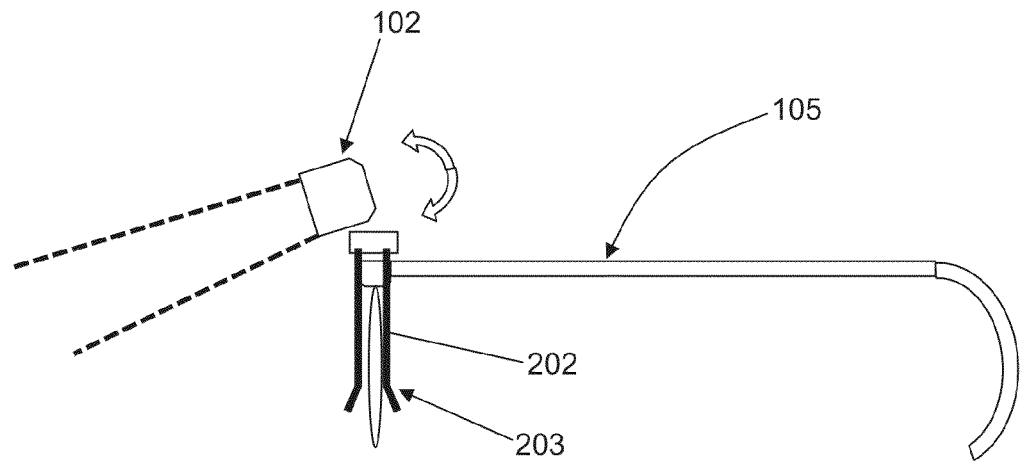
FIG. 8A schematically depicts one variation of a tilt mechanism and clip for attaching a vision aid to an eyeglass frame.

The optical system of a vision aid may be mounted on an eyeglass frame such that the light sources may be tilted to a desired angle. One example of an attachment mechanism that allows for adjustable tilt angles is depicted in FIG. 8A. The attachment mechanism may comprise clips 202, where the clips 202 may be similar to hairpins. There may be two clips 202 that are configured to engage the eyeglass frame 105 near the nose rests. The clips 202 may be made of flexible spring metal, such as spring steel. The ends of the clips may each comprise a bend 203. The bent ends of the clips may have soft plastic coatings to prevent scratching of the glasses. The bends 203 may increase the size of the clip opening (e.g., the space between the legs of the clip 202) to ease engagement to the glass frames, which may enable individuals with low-vision and/or limited manual dexterity to easily mount the vision aid on the eyeglasses. The spacing of the clips places them just outside the nose rests of the frame. The clips 202 may be brazed onto a rod 204, which may be retained within a housing 206 of the optical system, as shown in FIGS. 9A and 9B. The clips 202 may be located at a central portion of the elongate housing 206, and/or may be located at lateral portions of the elongate housing 206 (e.g., on the left and right side of the housing). In some variations, the clips 202 may comprise a loop end that may be coupled to the rod 204. The housing 206 may be made of two parts 206a, 206b that clamp together with screws. The housing 206 may comprise grooves that apply pressure on the rod 204 when the housing 206 is secured together with screws. This may provide a friction tilt mechanism. Clips may be made of any desired material, such as metal alloys (e.g., shape memory alloys, nickel titanium alloys, and the like) or polymers. For example, clips may be made of a lightweight plastic material, such as polycarbonate or polypropylene. Clips may be made by any suitable method, for example, injection molding. In some variations, plastic clips may be coated with a rubbery or non-slip material to increase the coefficient friction for securely contacting and/or engaging the glasses. This may help preventing the clips from slipping off the glasses, and/or reduce the force exerted by the clips on the glasses necessary to keep the optical system in place. The coating material may be a silicon adhesive such as Auto/Marine Silicon sealant from DAP Products Inc (Baltimore, Md.), RTV, or a spray or dip rubber coating such as Plasti Dip from Plasti Dip International (Blaine, Minn.). The inside surface of the clip that contacts the coating may be roughened, either as part of the injection molding process, or by sanding or filing, which may help to ensure that the coating adheres to the clips.

In the preferred embodiment, the optical system mounts forward of the clips. This prevents it from interfering with the user's forehead. In another embodiment, the rod 204 may comprise teeth to provide a ratchet mechanism for rotation. In another embodiment, the optical system may fasten to the clips with a flexible, bendable plate made out of a material such as 10-20 mm thick aluminum foil. Flexing this plate provides a tilt adjustment.

Figure 8B:
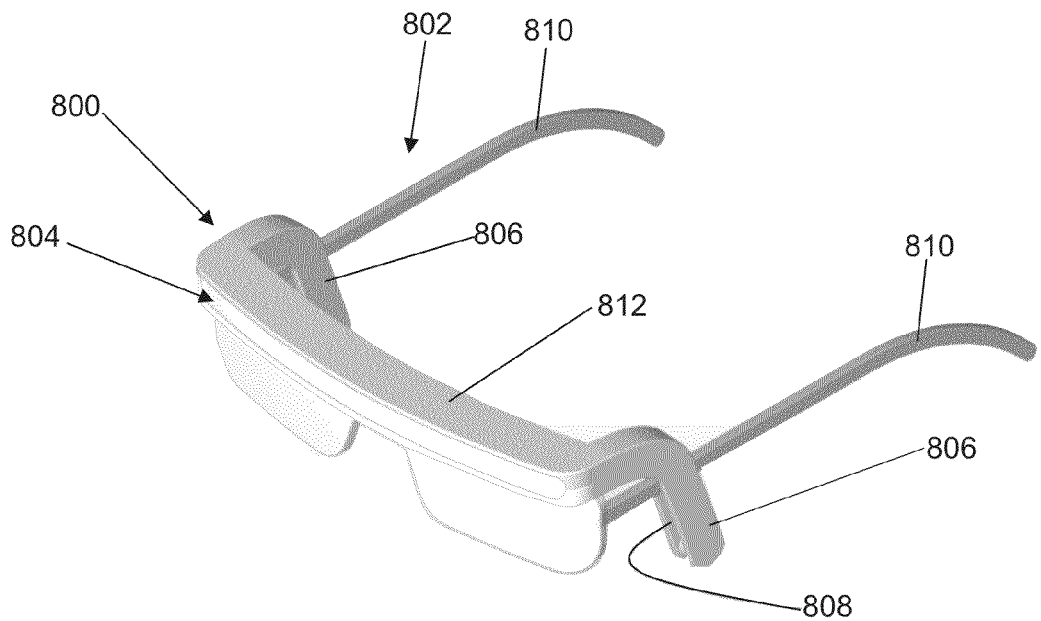
FIG. 8B depicts another variation of an attachment mechanism.

FIG. 8B depicts another variation of an attachment mechanism 800 for attaching the optical system 804 of a vision aid to an eyeglass frame 802. The attachment mechanism 800 may comprise two side rails 806 that have vertical slots 808 that are sized to slides onto the temple arms 810 of the eyeglass frame 802. The optical system 804 may be integrated with a horizontal bar 812 of the attachment mechanism 800. The horizontal bar 812 may comprise a horizontal groove that is configured to register along the top portion of the eyeglasses (e.g., bridge, top of lenses, top of rims, etc.). To mount the optical system 804 using the attachment mechanism 800, the temple arms 810 may be slid through the vertical slots 808 until the horizontal groove in the horizontal bar 812 engages the top edge of the eyeglasses. This may help provide an unobstructed field of view to the user. One or more components of the attachment mechanism 800 may be coated with a rubbery or non-slip material, such as those materials described above. For example, the inside surface of the side rail slots 808 may be coated with a non-slip material, and/or the inside surface of a horizontal bar groove may be coated. Alternatively or additionally, the entirety of the attachment mechanism 800 may be coated with a non-slip material. Optionally, the communication and/or power cable between the optical system and the power pack may be integrated within one or both of the side rails 806, which may help manage and direct the cable without tangling and/or passing over the user's face.

The optical system may tilt in an axis parallel to the upper bar of the eyeglass frame. This allows the user to direct the light to the portion of the page being read. The optical system may be tilted according to the lensing of the glasses, so that the text may be viewed at an angle that provides sufficient visual acuity. For example, the view angle may be lower for bifocals than for reading glasses. As readers maintain a constant view angle and constant distance between the glasses and the text, once the tilt is set, the light emanating from the optical system may be precisely registered to the text being read. This may help ensure that a rectangular field of illumination with high contrast borders is directed over the text being read. A reader may adjust the location of the illumination field (e.g., to scan up or down the page) by manually tilting the optical system to align the illumination field with the targeted reading region. Alternatively or additionally, the tilt angle of the optical system may be adjusted electronically, for example, using a control button or wheel on the power pack housing. The attachment mechanism 800 may be tilted using any of the mechanisms described above. Alternatively or additionally, the attachment mechanism 800 may be tilted by manually rotating the side rails 806 over the vertical slots 808 with respect to the temple arms 810. For example, the temple arm 810 may be engaged in the vertical slot 808 by friction-fit, which may allow the side rail 806 to move vertically and laterally with respect to the temple arm 810. The tilt angle of the optical system 804 within the horizontal bar 812 may be adjusted by moving the side rail vertically and/or laterally such that the side rail rotates with respect to the temple arm 810. This may in turn tilt the horizontal bar 812 to adjust the location of the illumination field. The tilt position may be maintained by the friction-fit engagement of the temple arms 810 with the vertical slot 808.

In another embodiment, magnets may be used to hold the optical system to the eyeglass frame. For example, small samarium-cobalt magnets may be used, as these are strong and have small mass. A first pair of magnets may replace the clips, so that the same tilt mechanisms may be employed as described above. A second pair of magnets with opposite polarity to the first pair of magnets (and/or a magnetic material, such as flat iron plates) may be affixed to the eyeglass frame near the bridge across the nose in order to provide a mating surface.

In another embodiment, the optical system may be integrated into the eyeglass frame. In this case, the tilt may be adjustable or customized for the user to match the type of lenses built into the frames. For instance, an angle that tilts more downward may be provided for bifocals and a less downward angle may be provided for reading glasses. The power/communication cable may also be integrally formed with one or both of the temple arms of the eyeglass frame. The integrally formed power cable may exit the temple arm at its proximal end closest to the ear, or anywhere along the length of the temple arm between the distal and proximal ends of the arm. A releasable coupling may be provided on the arm or elsewhere on the eyeglass frame to releasably connect the power supply or power pack to the eyeglasses.

The power pack 104 of a vision aid may be connected to the optical system 102 via a communication wire or cable 103 of FIG. 1, which powers the light sources 106 and optical system controls (e.g., controls for light intensity, tilt, on/off, etc.). The cable 103 may be about 4 feet to about 5 feet long. As depicted in FIG. 1, the power pack 104 is remote from the optical system 102 and eyeglass frame 105, but in other variations, the power pack may be mounted to the eyeglass frame. Use of a remote power supply may help reduce the weight imposed on the eyeglasses by the vision aid 100, as excess weight may cause the eyeglasses to slide down the nose. For example, the optical system 102 on the eyeglass frame 105 may weigh less than 50 grams, for example, less than 20 grams. In some variations, the power pack 104 may comprise a LiPo (lithium polymer) rechargeable battery, an intensity control lever or knob, a pilot light, and a power switch. The power switch may be a push button switch with tactile feedback, as this may be easier to operate by a person with limited manual dexterity. The box may comprise a standard LED driver IC (National LM3410), which in the preferred embodiment drives 12 LEDs (Osram Power TopLED with lens) in a 3 parallel—4 series configuration. Pulse-width modulation at 20 kHz is used to control average intensity, as is the standard practice.

Figure 10:
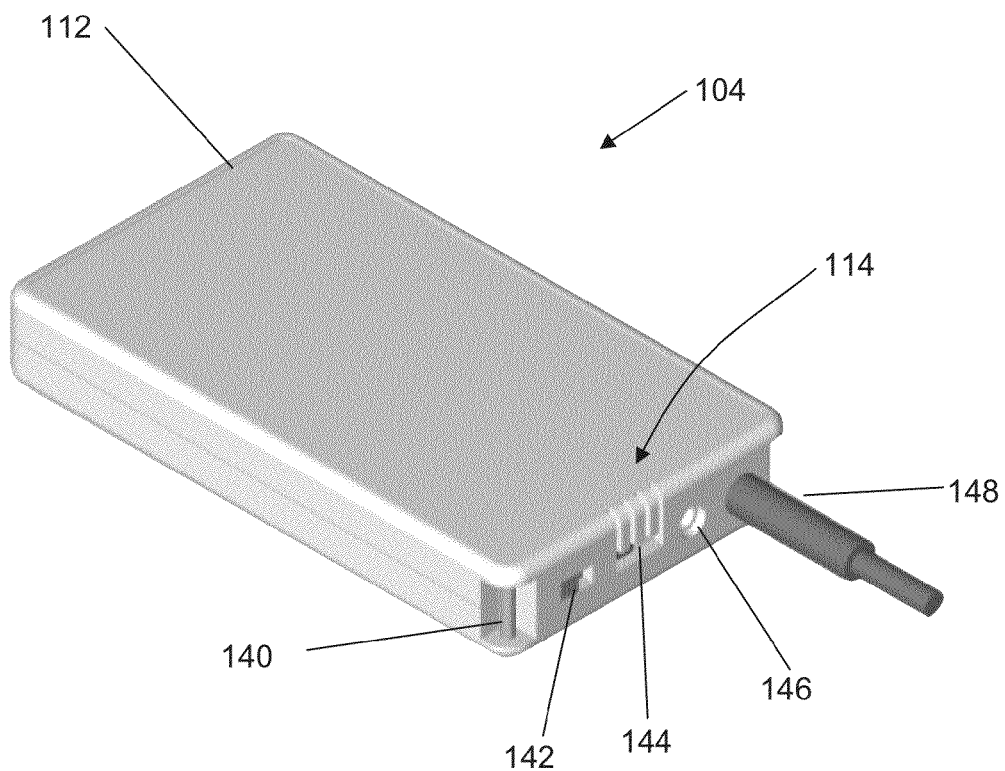
FIG. 10 is a perspective view of one variation of a power unit that may be used with a vision aid.

The power pack 104 of the vision aid may comprise a battery and have a compact size for portability. In some variations, the power pack 104 may comprise a two color LED that is green when battery is fully charged and red when the battery is charging and the power is on. This LED may be mounted behind a thumbwheel potentiometer 124 that controls intensity. A housing 112 of the power pack 104 may have one or more slotted openings 114, as depicted in FIG. 10. The LED light from the end or the side of the power unit may be viewed through the slotted openings 114 without occupying any additional space on the surface of the housing 112. The back lighting of the potentiometer may also be configured to indicate its location within the power supply housing 112. The power pack 104 may also comprise various controls and ports for communication with other electrical elements. For example, power pack 104 may comprise an ON-OFF switch 142, an intensity control 144 (e.g. a dial potentiometer), a cable connector or port 146 for the communication cable 103 to the optical system, and a power connector 148 for a 5-Volt AC adaptor. The power pack 104 may also comprise a circuit board with surface mount parts, which may help maintain the compact form factor. For example, the power pack 104 may comprise a 2200 mA·hr LiPo battery, which has a high power density and a compact form factor. A power pack may use a rechargeable battery, or may use a single-use non-rechargeable battery. Additionally or alternatively, the power pack may be configured to be plugged into a AC power socket via power connector 148. The power pack 104 may also comprise one or more bars 140 on the housing 112 for attachment of a lanyard. For example, there may be 1, 2, 4, or more bars for attaching a lanyard.

The communication cable 103 may be is flexible and may comprise two electrical wires or power lines to drive the LEDs. For example, the two wires may correspond to the supply voltage and ground. The supply voltage signal may be a square wave drive with a peak current of 30 mA and a peak voltage of 14.8 volts. In some variations, the circuitry driving the LEDs of the optical system 102 may use current drive, and the communication cable 103 may comprise a thin gauge wire (e.g., similar to wires that are used for ear buds). Vision aid 100 may also comprise a cable management feature that may be configured to route the cable along a path that is comfortable for the user. For example, a cable management feature may comprise a small plastic clip that is configured to fasten the cable to one of the sidebars of the eyeglass frame (the sidebars extend from the lenses to the ear along the side of the head). This clip may route the cable to drop down the side of the head. In another embodiment, the cable is routed along the sidebar to the back of the ear, so the cable runs behind the ear. In another embodiment, the optical system 102 and/or the light source(s) 106 may be integrated into the eyeglass frame. The sidebar of the frame may be hollow so the cable can run through the sidebar and exit the frame on either on the side of the head or behind the ear.

Figure 11:
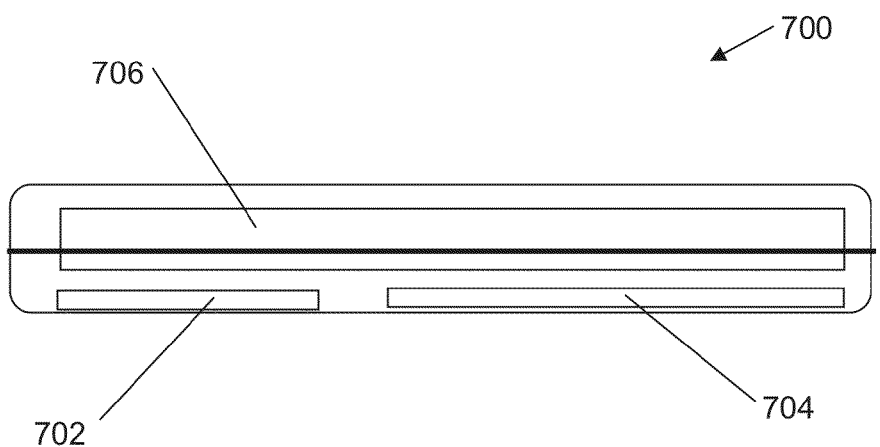
FIG. 11 schematically depicts one variation of a case for retaining a vision aid.

In some variations, a case may be provided to house the vision aid and the eyeglasses to which the vision aid may be attached. The case may also be configured to house the power supply unit and the communication cable between the power supply and the optical system. The case may be used for protecting the visual during transportation and storage. One example of a case 700 for housing the components of a vision aid is depicted in FIG. 11. The case 700 may have a compartment to house a battery 702, optical electronics 704, and the optical system 706. There may optionally be a compartment to house the eyeglasses to which the optical system 706 is attached. The case 700 may have a compartment and/or retractor and/or openings in the housing of the case to retain a communication cable that runs between the optical system 706 and battery 702. Optionally, the case 700 may also have an opening for a power chord from a wall AC adaptor. This may conveniently allow a user to either take the power supply unit out of the case or leave it in the case. For example, individuals with limited manual dexterity may elect to leave the power supply in the case when using the vision aid.

EXAMPLES

Figure 12:
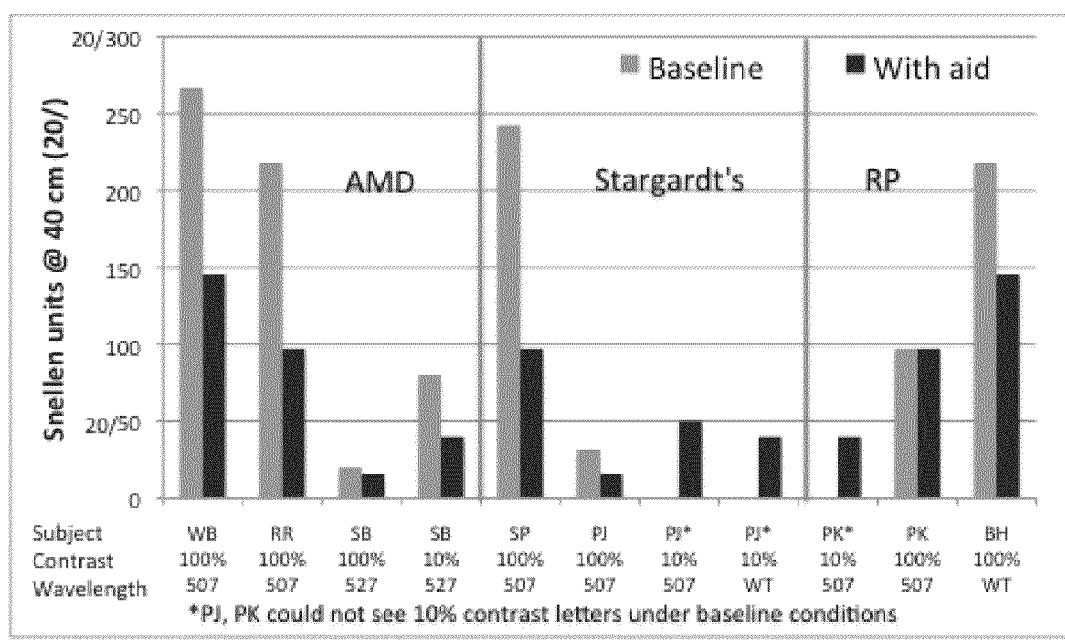
FIG. 12 is a histogram depicting the results of an experiment where the visual acuity of seven subjects is evaluated at baseline conditions (light bars) and with a vision aid (dark bars). The contrast and wavelength of the light provided by the vision aid are indicated across the bottom of the histogram.

As described above, some vision aids may use green light (e.g., at wavelengths of 507 or 527 nm) to improve reading acuity and comfort for a low-vision individual. FIG. 12 shows results from seven subjects, five with macular degeneration and two with retinitis pigmentosa. The vertical axis is acuity in Snellen units. The letter contrast and reading aid color is also shown. Measurements were conducted with either 100% contrast text sections (black text on white paper) or a Colenbrander 100% and 10% reading chart at 40 cm. The baseline represents the best conditions each subject had set up at home, often with the assistance of a low vision technician. The measured results were with prototype reading aids that were not cross-calibrated, using subdued lighting conditions as described above. In most cases, acuity was improved through use of the reading aid. All subjects reported significant improvement in comfort, which is essential for long duration tasks such as reading.

These surprising results suggest that use of color at higher illuminance levels may provide a benefit, possibly in reducing the glare and eye strain that the high illuminance level might otherwise cause, especially when used for extended duration reading tasks.

It is to be understood that this invention is not limited to particular exemplary embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "a blade" includes a plurality of such blades and reference to "the energy source" includes reference to one or more sources of energy and equivalents thereof known to those skilled in the art, and so forth.

The publications discussed herein are provided solely for their disclosure. Nothing herein is to be construed as an admission that the present invention is not entitled to antedate such publication by virtue of prior invention. Further, the dates of publication provided, if any, may be different from the actual publication dates which may need to be independently confirmed.

What is claimed is:

1. A low-vision aid, comprising:
an elongate housing, including;
a plurality of lensed LED lights located in the elongate housing in a substantially horizontal arrangement, the plurality of lights generating a peak intensity of at least 1000 lux;
a Fresnel lens with negative focal length, a flat surface of the lens facing into the housing and a ridged surface of the lens facing out of the housing; and
at least two clips, each clip comprising a superior region tiltably coupled to the elongate housing, an inferior region configured to attach to an eyeglass frame, an anterior surface and a posterior surface between the superior and inferior regions, wherein the elongate housing protrudes anteriorly to the anterior surface of each clip and the elongate housing is substantially flush with the posterior surface of each clip; and
a power pack coupled to the elongate housing by electrical wire;
wherein the low-vision aid generates an illumination field comprising a peak intensity, an illumination area that is 40 cm from and perpendicular to the plurality of lights and is no more than 120 $cm^2$, the illumination field comprising a horizontal center line, a vertical center line and a center point at the intersection of the horizontal and vertical center lines, wherein the vertical center line intersects a superior 10% vertical intensity point and an inferior 10% vertical intensity point, and wherein a 50% vertical intensity point of the vertical center line is located at a distance from the closest 10% vertical intensity point that is no greater than the lesser of 1 cm or one-third the distance from the closest 10% vertical intensity point to the center point, and wherein a distance between the superior and inferior 10% vertical intensity points is smaller than a distance between a first and second 10% horizontal intensity points intersecting the horizontal center line.

2. The low-vision aid of claim 1, wherein the lensed LED lights generate light comprising a peak wavelength in the range of about 500 nm to about 540 nm.

3. The low-vision aid of claim 2, wherein the lensed LED lights generate light comprising a peak wavelength of 507 nm or 527 nm.

4. The low-vision aid of claim 1, further comprising a case configured to enclose the power pack and the housing.

5. The low-vision aid of claim 1, wherein the elongate housing has a weight of 2 grams or less.

6. The low-vision aid of claim 1, wherein the lensed LED lights generate light comprising a peak wavelength in the non-red light spectrum.

7. The low-vision aid of claim 1, wherein the lensed LED lights generate light comprising a peak wavelength that is less than about 625 nm.

8. The low-vision aid of claim 1, further comprising a tilting mechanism configured to adjust the angle and location of the illumination field.

9. The low-vision aid of claim 1, wherein the at least two clips are coated with a non-slip material.

* * * * *